United States Patent [19]

Leining et al.

[11] 4,327,633
[45] May 4, 1982

[54] HAM SKINNING APPARATUS

[75] Inventors: Lyndon R. Leining; Kent L. Simonson, both of Austin, Minn.

[73] Assignee: Geo. A. Hormel & Co., Austin, Minn.

[21] Appl. No.: 259,906

[22] Filed: May 4, 1981

Related U.S. Application Data

[63] Continuation-in-part of Ser. No. 73,736, Sep. 10, 1979, abandoned.

[51] Int. Cl.³ .............................................. A22B 5/16
[52] U.S. Cl. .......................................... 99/589; 17/21; 99/593; 248/654
[58] Field of Search .................. 99/584, 587, 588–594, 99/567, 537, 540, 541; 17/21, 50; 30/296 R, 231; 248/654; 83/168, 169, 171

[56] References Cited

U.S. PATENT DOCUMENTS

| | | | |
|---|---|---|---|
| 1,872,731 | 8/1932 | Goranson et al. | 99/593 |
| 1,988,098 | 1/1935 | Weibel | 99/591 |
| 2,765,796 | 10/1956 | Guenther | 30/231 |
| 3,656,287 | 4/1972 | Morrison et al. | 248/654 |
| 3,848,493 | 11/1974 | Harris | 83/168 |
| 4,071,923 | 2/1978 | Smith | 17/21 |
| 4,186,461 | 2/1980 | Leining | 17/21 |

*Primary Examiner*—Philip R. Coe
*Assistant Examiner*—Timothy F. Simone
*Attorney, Agent, or Firm*—Williamson, Bains, Moore & Hansen

[57] ABSTRACT

A skinning apparatus includes a suspension device and a skinning device suspended by the suspension device for easy manipulation by an operator in removing the skin from the ham area of a hog carcass which is suspended from an overhead support. The skinning device includes a revolvable tooth roller and blade which cooperate with each other and which are dimensioned to progressively remove the skin from both ham areas of a hog carcass in a single pass. The suspension device permits easy manipulation of the heavy skinning device in following the contours of the ham areas of the suspended hog carcass during the skinning operation. Control means on the hand grips of the skinning device control operation of both the skinning and suspension device.

9 Claims, 11 Drawing Figures

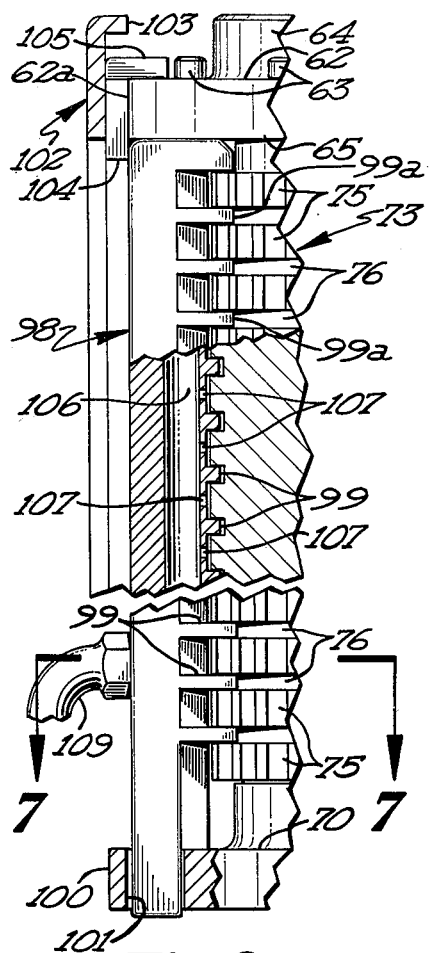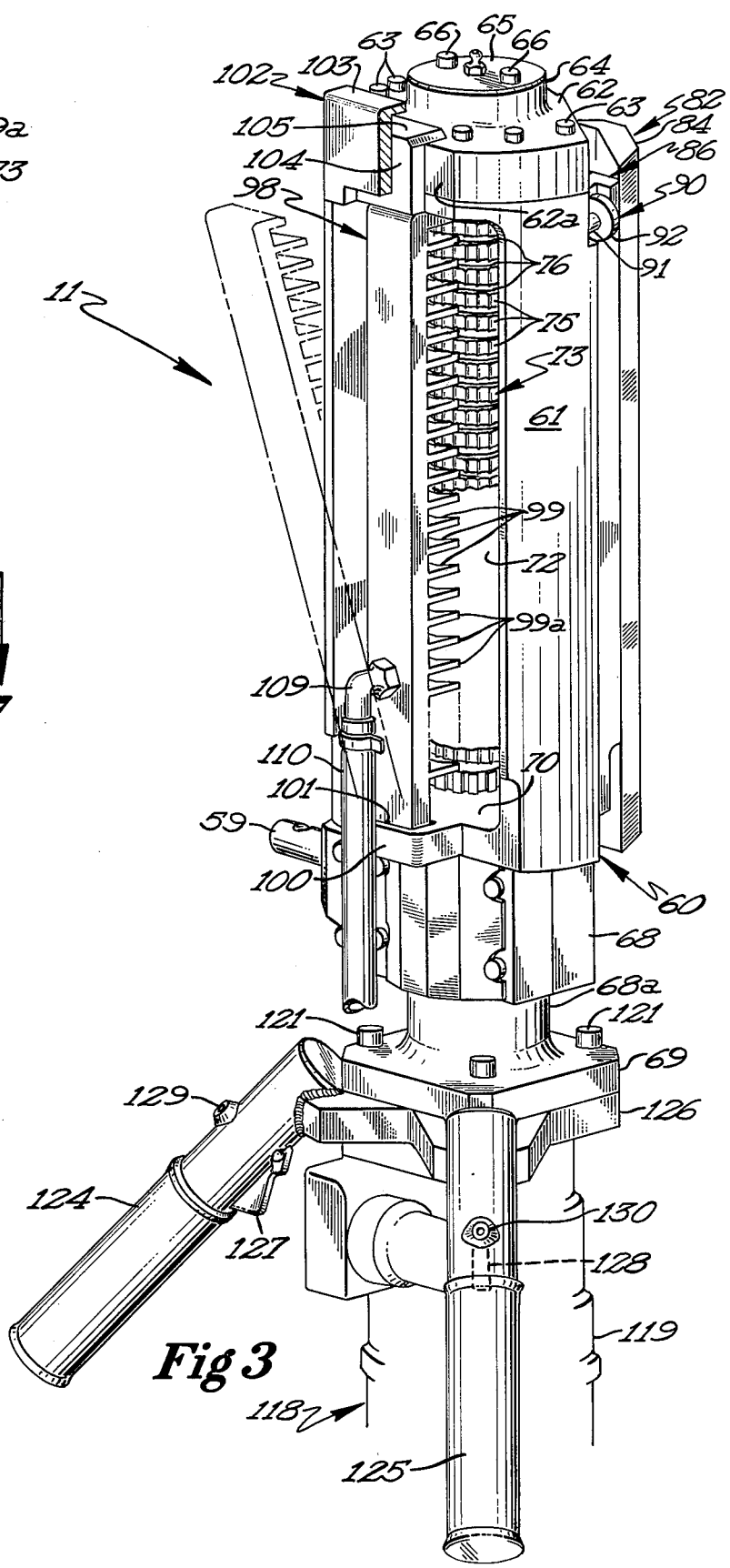

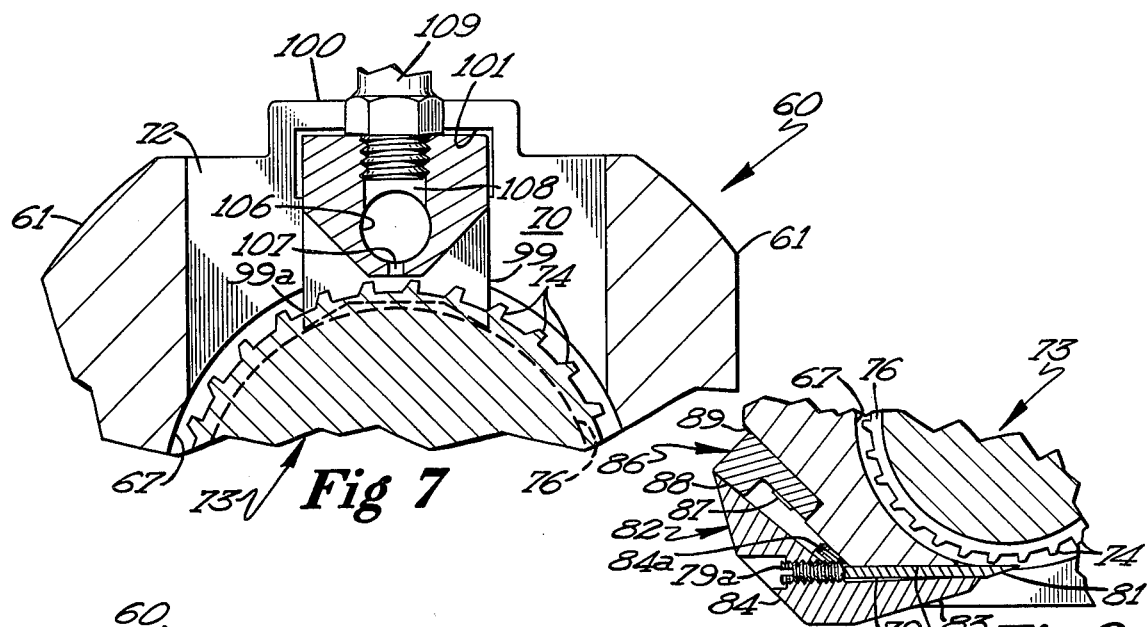
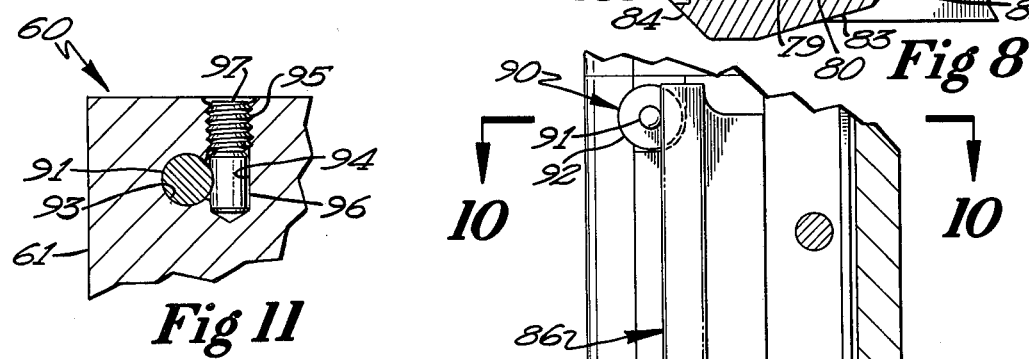
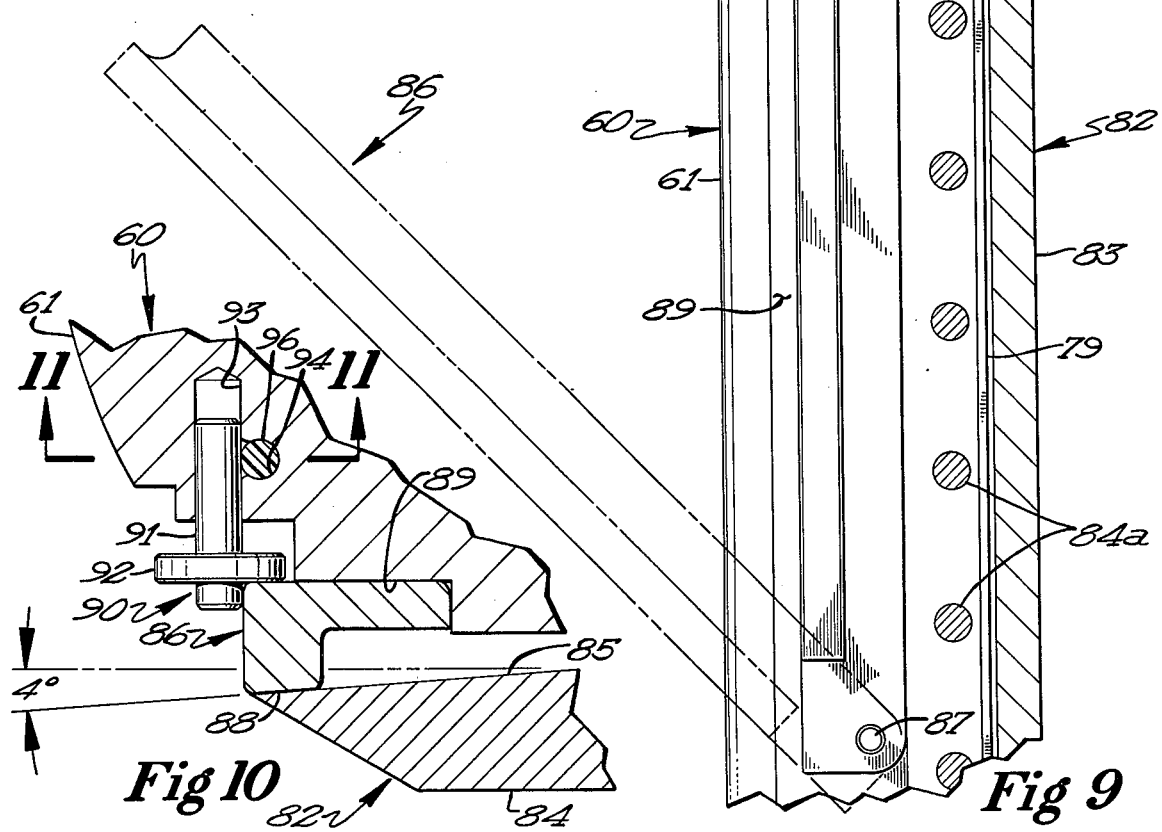

HAM SKINNING APPARATUS

The present application is a continuation-in-part application of my co-pending application, Ser. No. 73,736, filed Sept. 10, 1979, and entitled, "Ham Skinning Apparatus", now abandoned.

SUMMARY OF THE INVENTION

This invention relates to a skinning apparatus, and more particularly to a skinning apparatus for removing the skin from the ham area of a hog carcass.

In certain meatpacking operations, the hog carcasses are scalded, singed and eviscerated on the slaughter floor before the hogs are taken to a chilling room where the carcasses are held to allow the temperature to drop to a predetermined level. However, in applicant's system, the skin is removed from the hog carcasses shortly after the hog has been slaughtered. In this system, the skin is progressively removed from each hog carcass in steps and is therefore a continuous operation. The skin is first removed from the hind legs of the hog carcass in a pulling operation and is next removed from the ham area of the hog carcass by the apparatus disclosed in the present application.

After the skin is removed from the ham area, the hog carcasses which are suspended from an overhead conveyor are moved to a mid-section skinner where the skin is removed from the torso of the carcass. An apparatus and method for removing the skin from the torso of the hog carcass is disclosed in my co-pending application Ser. No. 43,041, filed May 29, 1979, and entitled "Method and Apparatus for Removing Skin on Animal Carcasses." Thereafter, the suspended hog carcass is moved to the next station and the skin is removed from the shoulder area of the carcass and then is moved to the final station where the skin is removed from the head of the carcass. It will therefore be seen that during the skinning operation, the hog is suspended from its hind legs so that its head is positioned downwardly. The skinning operation in this system progressively removes skin from the uppermost portion of the carcass as suspended to the lowermost portion of the carcass. The ham skinning apparatus, which is the subject of the present application, is the second step in the skinning operation.

It is therefore a general object of this invention to provide a ham skinning apparatus which is arranged and constructed to effectively and quickly remove the skin from both ham areas of the hog carcass in a single pass. A more specific object of this invention is to provide a ham skinning apparatus for removing the skin from the ham area of a hog carcass which is supported by a suspension device which permits an operator to easily manipulate the heavy skinning device in following the irregular contours of the ham area during the skinning operation.

These and other objects and advantages of this invention will more fully appear from the following description made in connection with the accompanying drawings, wherein like reference characters refer to the same or similar parts throughout the several views.

FIGURES OF THE DRAWINGS

FIG. 3 is a different perspective view of the skinning device;

FIG. 6 is a cross-sectional view taken approximately along line 6—6 of FIG. 5 and looking in the direction of the arrows;

FIG. 7 is a cross-sectional view taken approximately along line 7—7 of FIG. 6 and looking in the direction of the arrows;

FIG. 8 is a cross-sectional view taken approximately along line 8—8 of FIG. 2 and looking in the direction of arrows;

FIG. 9 is a cross-sectional view taken approximately along line 9—9 of FIG. 5 and looking in the direction of the arrows;

FIG. 10 is a cross-sectional view taken approximately along line 10—10 of FIG. 9 and looking in the direction of the arrows; and FIG. 11 is a cross-sectional view taken approximately along line 11—11 of FIG. 10 and looking in the direction of the arrows.

DESCRIPTION OF THE PREFERRED EMBODIMENT OF THE INVENTION

Figure 1:
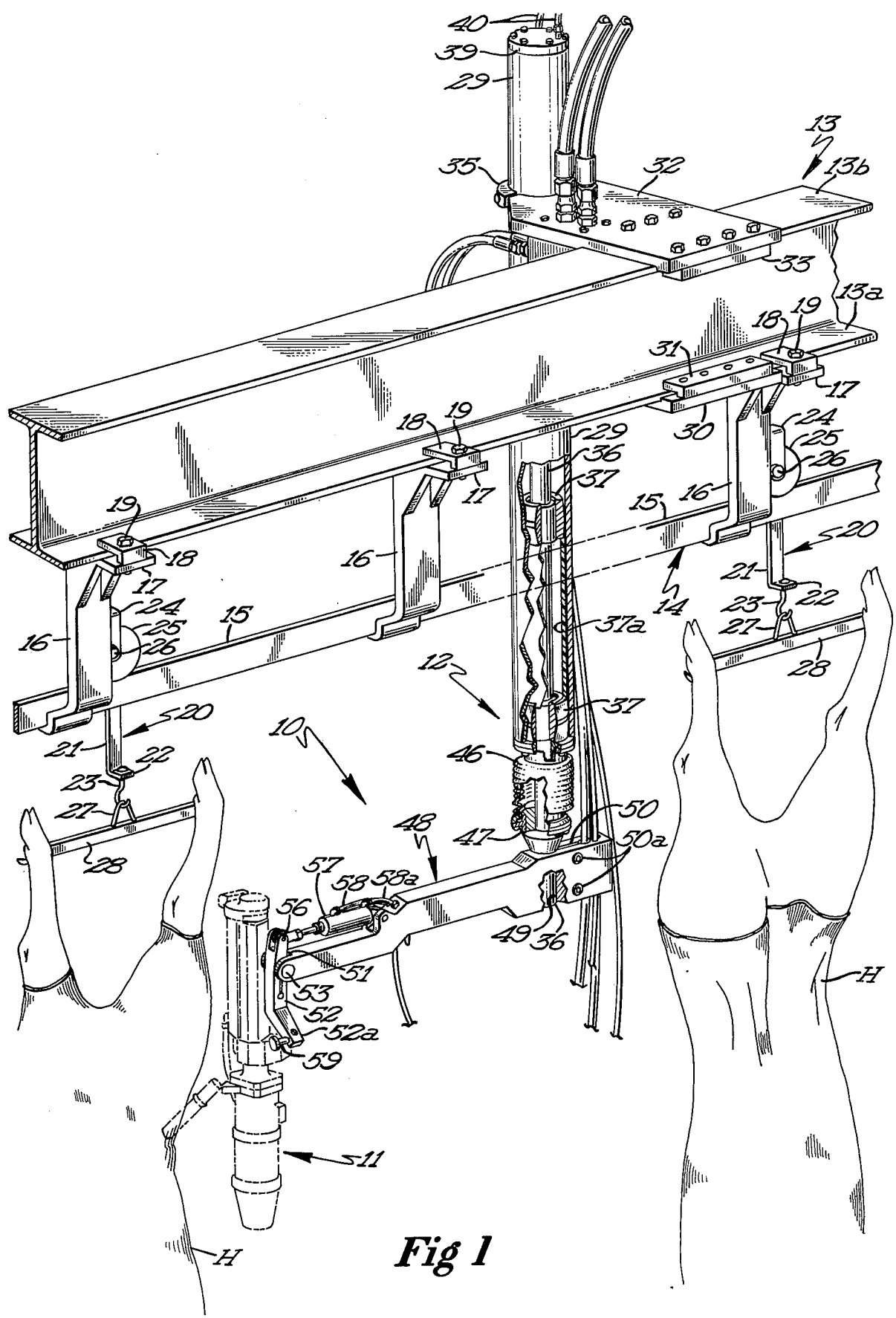
FIG. 1 is a perspective view of the ham skinning apparatus.

Referring now to the drawings and more specifically to FIG. 1, it will be seen that one embodiment of the ham skinning apparatus, designated generally by the reference numeral 10, is thereshown. The ham skinning apparatus 10 includes a skinning device 11 which is suspended from an overhead support by a suspension device 12. In the embodiment shown, the overhead support comprises an I-beam 13 which also provides a support for an overhead track system 14.

The overhead track system includes an elongate horizontally disposed track 15 which has a plurality of longitudinally spaced apart vertically disposed hangers 16 secured thereto and projecting upwardly therefrom. Each hanger 16 has a horizontally disposed fixed clamping plate 17 affixed to the upper end thereof which engages the lower surface of the lower flange 13a of the I-beam 13. The lower flange 13a of the I-beam 13. The lower flange 13a of the I-beam is clamped between the fixed clamping plate 17 and an L-shaped movable clamping plate 18 by a bolt 19 which threadedly engages the fixed clamping plate.

Each hog H which is to be skinned is supported from the overhead track 15 by a trolley support 20 which includes a vertical strap 21 having a horizontally disposed lower end portion 22 integral therewith. A vertically disposed hook 23 is affixed to the horizontal end portion 22 and depends therefrom. The vertical strap 21 includes a U-shaped upper end portion 24 straddling a track engaging roller 25 which is secured thereto by an axle pin 26. The roller 25 permits the trolley support to be moved along the track 15.

The trolley support also provides a means for movably suspending the hogs H in vertical relation therefrom. To this end, the rear legs of the hog H are pierced by a gambrel 28 having an eye 27 integral therewith which is engaged by the hook 23. The gambrel 28 is a conventional device used to support hogs by their rear legs from an overhead support. During the skinning operation, the skin is progressively removed from the hog carcass in steps starting with the hind legs and moving downwardly at each successive step.

The suspension device 12 includes an elongate, stationary support 29 which is rigidly secured to the overhead I-beam 13. In this regard, a bracket 30 is secured to the lower flange 13a of the I-beam 13 by a plate 31. Similarly, a bracket 32 is secured to the upper flange 13b of the I-beam by a plate 33. The bracket 30 is provided with a clamp 34 which is secured to the bracket by suitable screws to clamp the bracket 30 to the vertical support 29. Similarly, the bracket 32 is secured to the vertical support 29 by a clamp 35. It will be noted that the vertical support 29 which is of cylindrical configuration projects upwardly beyond the I-beam 13 and the upper bracket 32.

An elongate vertically disposed suspension member 36 is positioned interiorly of the vertical support 29 and is revolvable and capable of vertical translation relative to the vertical support. Suitable bearings 37 are interposed between the suspension member 36 and the vertical support 29 which is of cylindrical configuration projects upwardly beyond the I-beam 13 and the upper bracket 32.

An elongate vertically disposed suspension member 36 is positioned interiorly of the vertical support 29 and is revolvable and capable of vertical translation relative to the vertical support. Suitable bearings 37 are interposed between the suspension member 36 and the vertical support 29 to permit relative rotation of the suspension member about an axis disposed substantially coaxial with the vertical support member. The vertical support 29 has an end cap 39 rigidly affixed to its upper end and a pneumatic cylinder 38 is secured to the end cap and projects downwardly therefrom interiorly of the vertical support. The pneumatic cylinder 38 is of the double-acting type and is connected to a source of air under pressure by suitable conduits 40 which selectively supply air to opposite end portions of the cylinder.

The pneumatic cylinder 38 is provided with a piston which is movable therein and which is connected to a piston rod 41 that is extensible and retractable relative to the cylinder. The lower end of the piston rod 41 is rigidly connected to a bearing housing 42 which contains bearing elements 43. An attachment plate 44 engages the upper surface of the bearing race and is secured to the upper rod of the suspension member 36 by means of suitable bolts. A snap ring 45 is secured to the interior of the housing 42 adjacent the lower end thereof and engages and holds the bearing elements in the housing to permit rotation of the suspension member about its longitudinal axis. It will be seen that extension and retraction of the piston rod 41 relative to the pneumatic support cylinder 38 causes vertical translation of the suspension member 36 relative to the vertical support 29.

The lower end of the suspension member 36 projects beyond the lower end of the vertical support 29, as best seen in FIG. 1. However, a flexible, yieldable bellows member 46 is secured to the lower end of the vertical support 29 and projects downwardly therefrom. The lower end of the bellows member is connected to a bearing assembly 47 through which the suspension member 36 projects. The lower end of the suspension member projects through an opening 49 in one end portion of an elongate horizontal member 48. It will further be noted that an end portion of the horizontal member 48 also has a vertical slot 50 therethrough communicating with the vertical opening 49. Suitable bolts 50a passing through the slotted end portion of horizontal member 48 clamp the latter to the lower end of the suspension member 36. It will therefore be seen that the horizontal member 48 is rotatable and vertically translatable with the suspension member 36.

It will be noted that the other end of the horizontal member 48 is notched or bifurcated to define a slot 51 thereat which receives an elongate pivot arm 52 therein. The pivot arm 52 is pivotally connected to the horizontal member by a pivot 53 to permit pivoting of the arm about an axis extending substantially transversely of the horizontal member 48 and substantially normal to the longitudinal axis of the suspension member 36.

The upper end of pivot arm 52 projects upwardly beyond the horizontal member 48 and is bifurcated as at 54. One end portion of an elongate piston rod 55 is positioned between the bifurcated end 54 of the pivot arm 52 and is pivotally connected thereto by a pivot 56. The pivot rod 55 projects interiorly of a pneumatic cylinder 57 and is connected to a piston therein for longitudinal movement relative thereto. Conduits 58 and 58a are connected in communicating relation with the pneumatic cylinder 57 on opposite sides of the pistons therein. The conduits 58 and 58a are connected to a source of air under pressure (not shown) so that when the air pressure on either side of the piston within the cylinder falls below a predetermined pressure, air will be supplied to the side having the reduced pressure. In other words, the piston is disposed in a position of balanced pressure within the cylinder and therefore acts as a counterbalance when the arm 52 pivots about the pivotal axis 53.

The pivot arm 52 has an offset lower end portion 52a and the lower end of the lower end portion is pivotally connected to the skinning device 11 by a pivot 59. This pivotal connection between the pivot arm 52 and the skinning device permits the latter to be pivoted about an axis disposed substantially parallel to the general longitudinal axis of the horizontal member 48. It is pointed out that the pivotal axis between the pivot arm 52 and the skinning device 11 is located at approximately the center of gravity of the skinning device. This location of the pivot axis 59 is necessary because the skinning device is quite heavy and would require great effort by the operator in tilting the skinning device during the skinning operation. However, by locating the pivotal axis 59 at approximately the center of gravity of the skinning device, an operator may readily tilt the skinning device with a minimum of effort when following the non-symmetrical contours of the ham area of the hog carcass.

The skinning device 11 includes an elongate, vertically oriented housing 60 cast from a suitable metal, preferably stainless steel, and including an elongate vertical wall 61 which is of generally cylindrical configuration. The housing 60 also includes an upper end wall 62 which is secured to the vertical wall 61 by bolts 63, as best seen in FIG. 3. The upper end wall also includes a centrally located embossed portion 64 which is provided with an end cap 65 secured to the end wall by bolts 66.

Figures 2, 5:
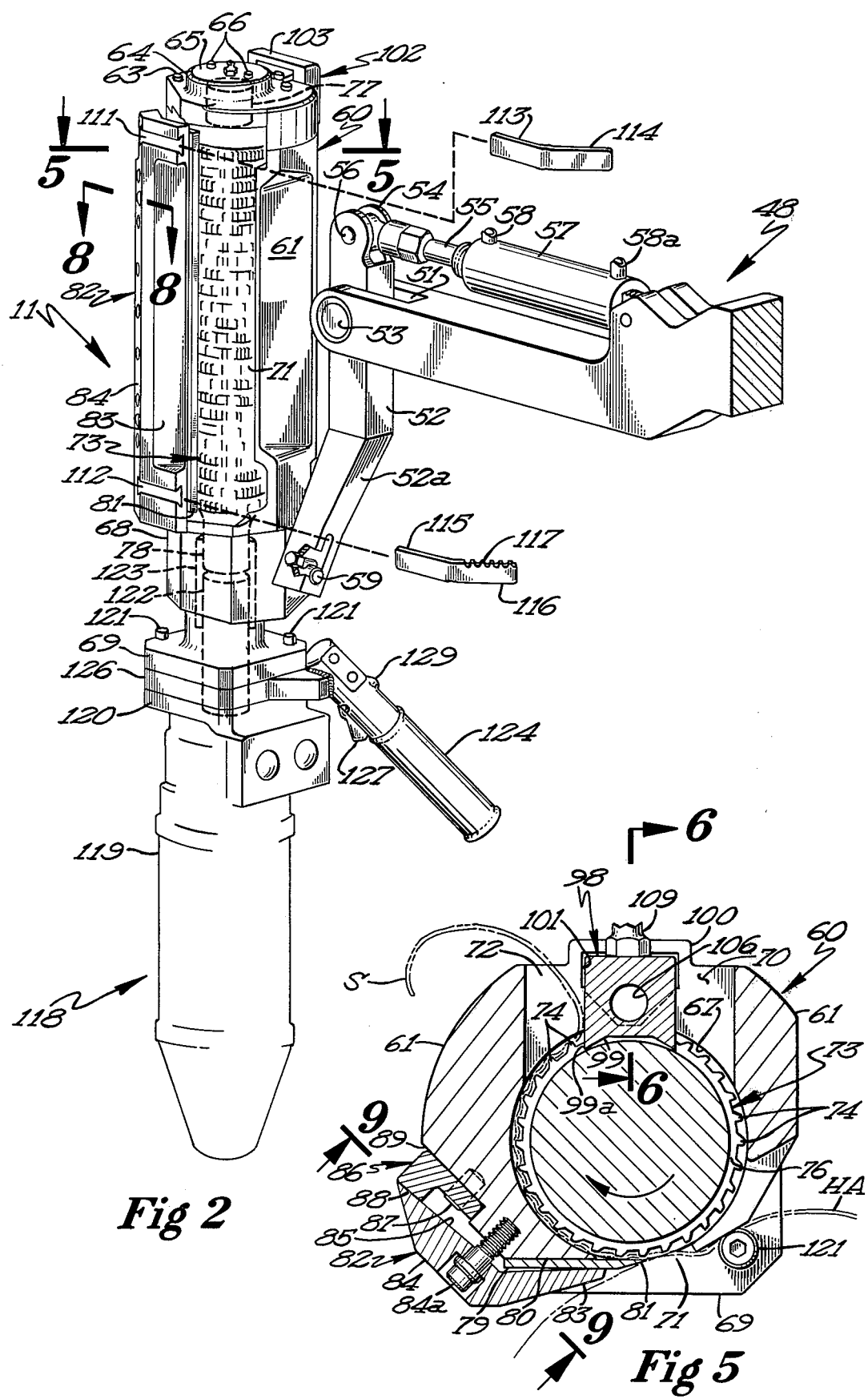
FIG. 2 is a perspective view of the skinning device with certain parts thereof exploded and other parts thereof designated by dotted line configuration.
FIG. 5 is a cross-sectional view taken approximately along line 5—5 of FIG. 2 and looking in the direction of the arrows.
Figure 4:
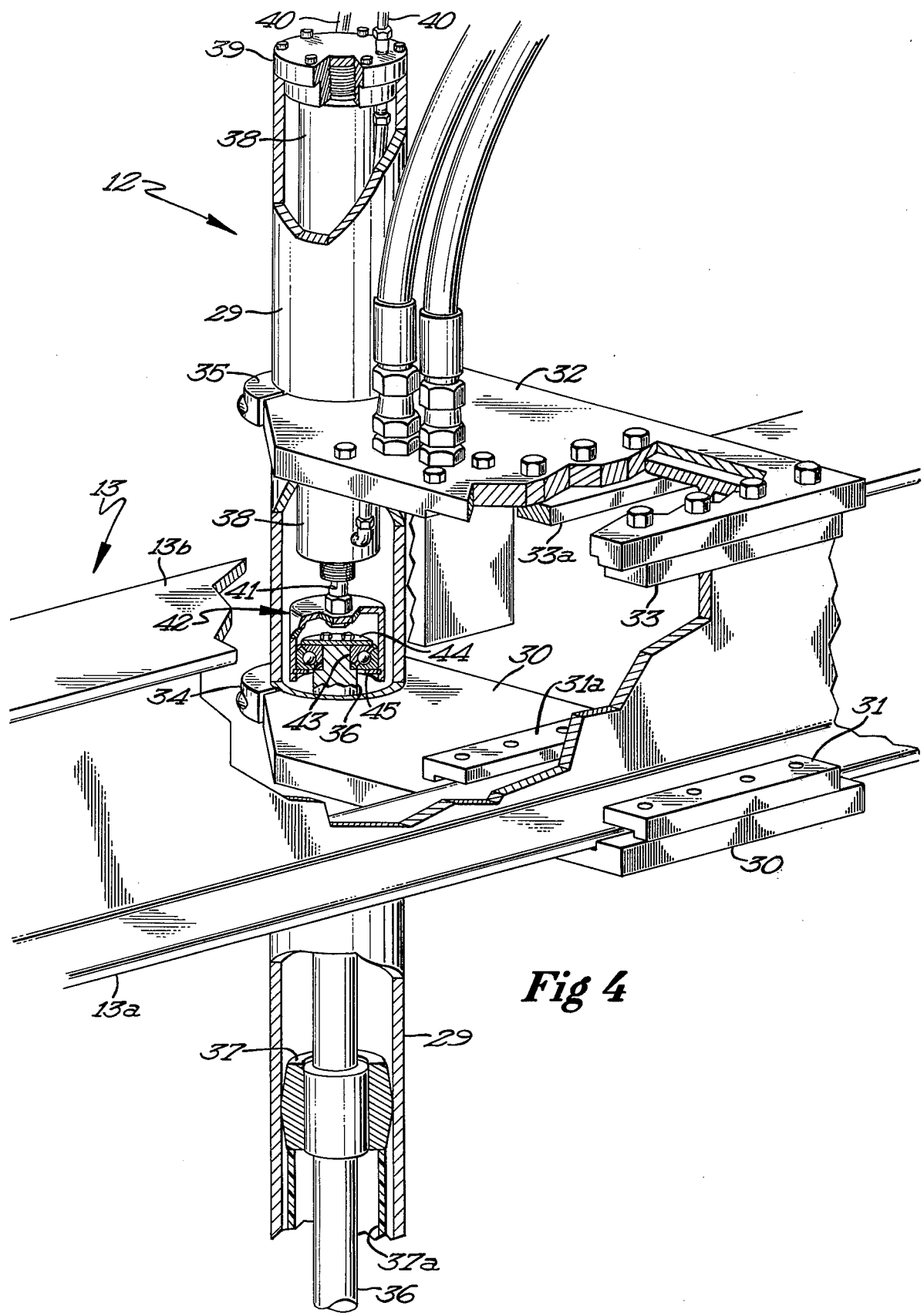
FIG. 4 is an enlarged perspective view of the upper portion of the suspension device with certain parts thereof broken away for clarity.

Referring now to FIGS. 5, 7, and 8, it will be seen that the housing 60 has a cylindrical interior surface 67 which is of generally uniform cross-sectional configuration throughout the major portion of the housing. The housing 60 also includes a cylindrical lower end 68 which is slightly smaller in diameter than the major portion of the housing. The reduced lower end portion 68 of the housing is further reduced to form a cylindrical neck 68a below the reduced cylindrical end portion 68, and this cylindrical neck terminates in a generally rectangular shaped outturned flange 69. A transverse horizontally disposed floor 70 is defined between the reduced lower end 68 and the major portion of the housing, as best seen in FIG. 3.

The housing 60 is provided with an infeed opening 71 therein which extends vertically throughout substantially the major length of the housing along one side portion thereof. The housing 60 is also provided with a discharge opening 72 therein which also extends vertically throughout the major length of the housing and which is located almost diametrically opposed to the infeed opening 71.

An elongate generally vertically disposed tooth roller 73, of generally cylindrical configuration, is positioned in the housing 60 and extends substantially throughout the vertical or axial dimension thereof. The tooth roller is provided with a plurality of teeth 74 which are arranged in vertically or axially spaced apart rows 75. The rows of teeth 75 define annular grooves or spaces 76 between adjacent rows. The tooth roller has a stub shaft (not shown) which projects from the upper end thereof and is journaled in a bearing 77 which is positioned in the upper end portion of the housing 60, as best seen in FIG. 2. The tooth roller 73 also includes the lower stub shaft 78 which projects through the opening in the floor 70 and is drivingly connected with a drive system for the tooth roller. This drive system will be described more fully hereinbelow.

Referring again to FIGS. 5, 7, and 8, it will be seen that the diameter of the tooth roller 73 is only slightly smaller than the diameter of the interior of the housing 60. The function of the roller is to grip the skin of the ham portion of the hog carcass during the skinning operation and to pull the skin against a skinning blade mounted on the housing.

To this end, the skinning device is provided with an elongate, substantially flat blade 79 which is positioned against a flat surface 80 on the housing adjacent the infeed opening 71. The blade 79 has its cutting edge 81 positioned in the opening in the housing and positioned closely adjacent the periphery of the tooth roller 73, as best seen in FIGS. 5 and 8. The blade 79 is retained in mounted relation on the housing by an elongate blade retainer 82 which is of generally angular configuration. The retainer includes a blade engaging portion 83 and an offset portion 84. The offset portion 84 is provided with a plurality of recesses therein and suitable bolts 84a pass through openings in the offset portion and threadedly engaged in threaded recesses in the housing. The blade engaging portion engages the outer surface of the blade 79. Suitable bolts 79a threadedly engage threaded recesses in the blade retainer 82 and engage the edge of the blade to position the cutting edge 81 of the blade in proper relation to the tooth roller. It will be appreciated that the blade 79 may be adjusted relative to the toothed roller by adjustment of the bolts 79a.

Means are provided for causing the blade retainer 82 to be urged in clamping relation with the blade 79 and this means includes an elongate generally L-shaped wedge member 86 which is pivotally connected at its lower end to the housing 60 by a pivot 87. This wedge member is therefore mounted on the housing for pivoting movement into and out of clamping relation with the blade retainer. In this regard, the offset portion 84 of the blade retainer has an inner planar surface 85 which is tapered at an angle of approximately 4° as best seen in FIG. 10. This planar surface is engaged by a flat surface 88 on the wedge member 86 when the wedge member is swung to a clamping position as shown in full-line configuration in FIG. 9.

Means are provided for retaining the wedge member 86 in the clamping position and includes a keeper member 90 including an elongate shank 91 and a circular head 92. It will be noted that the head 92 is integral with the shank 91 adjacent but spaced from one end thereof. The shank 91 projects into an opening 93 in the housing and is movable therein between release and non-release positions. Referring again to FIG. 10, it will be seen that the keeper member is illustrated in the non-release condition and engages the wedge member 86 to retain the latter in wedging relation with the blade retainer 82. The keeper member will be urged into the recess 93 when in the release condition to permit the wedge member to be pivoted to the dotted line position of FIG. 9.

Referring now to FIG. 11, it will be seen that the housing 60 has an opening 94 therein including an upper threaded portion 95. It will also be seen that the opening 94 communicates with the recess 93 which accommodates the shank of the keeper member 90. A substantially cylindrical plastic member 96 is positioned in the lower portion of the opening 94 and a threaded element 97 threadedly engages the upper threaded portion of the opening. When the threaded element 97 is threaded against the plastic element, the latter will be deformed and will be urged against the shank 91 of the keeper member and will frictionally resist any movement of the keeper member. Thus, the keeper member must be forceably moved in order to shift it between the release and non-release positions.

The skinning device is also provided with an elongate generally vertically disposed, rectangular shaped stripper bar 98 which is mounted on the housing 60 and which is positioned in the discharge opening 72. The stripper bar 98 is provided with a plurality of similar, vertically spaced apart generally rectangular shaped lateral stripper elements 99 integral therewith and projecting laterally at right angles therefrom. Each of the stripper elements 99 projects into one of the grooves 76 between adjacent rows of teeth as best seen in FIG. 6. The inner edge 99a of these stripper elements tangentially engage the tooth roller to strip the skin from the roller.

Referring now to FIG. 5, it will be seen that the housing 60 is provided with a small lateral projection 100 adjacent the lower portion thereof and this projection has a slot 101 therein for receiving the lower end of the stripper bar 98.

Referring again to FIGS. 3 and 6, it will be seen that a stop member 102 is rigidly secured to the upper portion of the housing 60 adjacent the discharge opening 72. The stop member 102 which is of rectangular configuration is vertically disposed and has an inturned horizontally disposed flange 103 integral with its upper end and projecting inwardly therefrom. It will be noted that the upper wall 62 has a flat surface 62a which is spaced from the stop member 102. A generally rectangular shaped latch member 104 is disposed between the stop member 102 and the flat surface 62a of the upper end wall 62 and is slidable therebetween. The latch element 104 also has an inturned flange 105 which is integral therewith and projects inwardly therefrom to overhang the upper surface of the upper end wall 62, as best seen in FIG. 6. The latch element 104 is vertically shiftable between latched and unlatched positions. When the latch element 104 is in the latched position, as illustrated in FIG. 6, the lower end portion of the latch element is positioned in engaging relation with the upper end portion of the stripper bar 98. When the latch element is in the unlatched position, it is moved upwardly from the latched position until it engages the flange 103 on the stop member 102. The stripper bar may then be removed to clean the latter.

Means are also provided for cleaning the stripper bar and the tooth roller during operation of the skinning device. Referring now to FIGS. 6 and 7, it will be seen that the stripper bar 98 has an elongate cylindrical chamber 106 therein which extends throughout its longitudinal or vertical extent. The stripper bar is also provided with a plurality of outlet ports 107 each being located between an adjacent pair of stripper elements and each communicating with the chamber 106. The stripper bar 98 is also provided with an inlet 108 adjacent its lower end which communicates with the chamber 106 and which is connected by a suitable fitting 109 to a suitable flexible conduit 110. The flexible conduit 110 is connected to a source of water under pressure so that water is supplied through the ports 107 to constantly remove hair and other material from the stripper bar and the tooth roller during operation of the skinning device.

Referring now to FIG. 2, it will be seen that the housing 60 is provided with an elongate horizontally disposed upper slot 111 therein adjacent the infeed opening 71. The housing is also provided with a similar elongate, horizontally disposed lower slot 112 therein located adjacent the lower portion of the infeed opening 71. The upper slot 111 receives one end portion of an elongate upper marker element 113 which has an offset end portion 114 which projects therefrom beyond the upper end portion of the cutting edge 81 of the blade 79. This top marker element serves to indicate where the hide will be cut from the ham area of the carcass when the hide extends beyond the upper end of the blade. A lower slot 112 accommodates one end portion of an elongate lower marker element 115 which also has an offset end portion 116 that projects into the infeed opening 71 beyond the cutting edge of the blade 79. The offset end portion 116 of the lower marker element 115 has a serrated upper edge 117 that serves to comb the hair of the carcass prior to cutting by the blade 79 to thereby minimize the cutting of hair which will contaminate the carcass.

Means are provided for operating the skinning device and this means includes hydraulic motor 118 which has a housing 119 provided with a flange 120 at its upper end. The flange 120 is connected by suitable bolts 121 with the flange 69 located on the lower end of the housing 60. The output shaft 122 of the hydraulic motor is connected to the shaft 78 of the tooth roller 73 by a coupling member 123. It will therefore be seen that when the hydraulic motor 118 is energized, the tooth roller 73 will be revolved.

Controls are provided for operating the ham skinning apparatus and include a left hand steering handle 124 and a right hand steering handle 125 each of which are affixed to a plate 126 which is interposed between the flange 20 of the hydraulic motor housing and the flange 69 of the housing 60. It will be seen that this plate 126 is clamped between these flanges and is integral with the housing 60 and motor housing 119. The left hand steering handle 124 has a trigger 127 thereon which, when depressed, energizes the hydraulic motor 118 to rotate the tooth roller 73 in a counterclockwise direction. The right steering handle 125 has a trigger 128 thereon which, when depressed, energizes a hydraulic motor to operate the tooth roller in a clockwise direction.

The left hand steering handle 124 also has an opening 129 therein which is connected to an air control valve (not shown) for controlling operation of the pneumatic cylinder 138. Similarly, the right hand steering handle 125 also has an opening 130 therein which is connected in communicating relation with the air control valve for the pneumatic cylinder 138. These openings are controlled by the thumb of the operator. When the opening 129 is closed, the control system for the pneumatic cylinder operates to retract the piston rod 41 and to raise the suspension member 36 and the skinning device 11. When the opening 130 is closed and the opening 129 is allowed to remain open, the control valve for the pneumatic cylinder 38 will be actuated to extend the piston rod 41 and the suspension member 36 to lower the skinning device 11. It will be appreciated that the skinning device is quite large and heavy and cannot be manually lifted by the operator during the skinning operation. Thus, the pneumatic cylinder permits raising and lowering of the skinning device during the skinning operation by requiring the operator to simply manipulate the openings 129 and 130.

During the operation of the skinning device, the hog carcasses H will be moved from left to right as viewed in FIG. 1. It will be seen that the skin from the hind legs of the hogs will have been removed by the hind leg skinning pulling device which is the subject matter of another co-pending patent application. When the hog carcasses are in a position so that the ham skinning device can remove the skin from the ham areas HA of the carcass, the operator will grip the steering handles 124 and 125 and will manipulate the skinning device to the desired position. As pointed out above, tilting of the skinning device may be accomplished manually since the skinning device is suspended in a balanced manner by the location of the pivot 59 and the balancing effect produced by the pneumatic cylinder 67. The operator will adjust the height of the skinning device by manipulation of the openings 129 and 130 and will tilt the device so that the skinning device is positioned against the ham area HA. The trigger on the right hand steering handle will be depressed to operate the tooth roller in a clockwise direction which pulls the skin against the blade 79. The skin S will be gripped by the tooth roller and will be progressively removed from each ham area HA and will be discharged through the discharge opening 72 as best seen in FIG. 6. The operator will continuously apply the skinning device to both ham areas to remove the skin thereon in one pass. During this skinning operation, the skinning device will be tilted as desired and will be raised and lowered as required. Water from the stripper bar 98 will continuously remove hair and other debris from the tooth roller and stripper bar during the skinning operation. The cutting blade 79 may be readily removed as desired, and the stripper bar may also be readily removed during maintenance and clean up of the skinning device.

From the foregoing description, it will be seen that I have provided a ham skinning device which permits an operator to completely remove the skin from the ham area of a hog carcass in a single pass without requiring undue physical effort by the operator. It will be seen that the ham skinning apparatus is arranged and constructed so that the heavy, massive skinning device can be easily maneuvered and manipulated during the skinning operation to very effectively remove the skin from the irregularly contoured ham areas of the carcass.

Thus, it will be seen that we have provided a novel ham skinning apparatus which functions in a more efficient manner than any heretofore known comparable apparatus.

It is anticipated that various changes can be made in the size, shape and construction of the ham skinning apparatus disclosed herein without departing from the spirit and scope of the invention as defined by the following claims.

What is claimed is:

1. A skinning apparatus for removing skin from the ham area of a hog carcass, comprising:

a skinning device including a generally vertically oriented housing having a hollow interior and having elongate, generally vertically oriented infeed and outlet openings therein, said openings being spaced apart relative to each other, an elongate vertically oriented tooth roller revolvably mounted within said housing for revolving movement relative thereto, an elongate generally vertically oriented skinning blade having a cutting edge, means mounting said blade on said housing adjacent said infeed opening to position the cutting edge of the blade closely adjacent the tooth roller each having a length dimension corresponding generally to the length dimension of the ham area of a hog whereby said tooth roller will grip the skin of the hog carcass and pull the same against the cutting edge of the blade to remove the skin from both ham areas of the hog carcass in a single pass, an elongate generally vertically oriented stripper bar having a plurality of stripper elements projecting therefrom, means mounting said stripper bar on said housing adjacent said outlet opening to position the stripper elements in close tangential relation to the tooth roller whereby the skin gripped by the tooth roller and removed from the ham area of the hog carcass will be engaged by the stripper bar and directed through the outlet opening, first power means secured to said housing at the lower end thereof and being operable for selectively revolving said tooth roller in a clockwise and counterclockwise direction, said first power means having an output shaft connected in driving relation with the tooth roller to revolve the same when said first power means is energized, control means connected with said power means for actuating and controlling the latter, a suspension device including a stationary support, an elongate vertically disposed suspension member, second power means connected with said stationary support, means interconnecting said second power means with the upper end of said suspension member to permit rotation and vertical translation of the suspension member relative to the stationary support, means connecting the lower end of said suspension member with said skinning device to permit tilting of said skinning device about a substantially horizontal axis, and control means for controlling operation of said second power means to permit vertical translation of the suspension member and vertical shifting of the skinning device.

2. The apparatus as defined in claim 1 wherein said stripper bar has an elongate chamber throughout its interior, means connecting said chamber in communicating relation with a source of water under pressure, and a plurality of outlet ports in said stripper bar communicating with said chamber and facing said tooth roller whereby water will be directed against the tooth roller during the skinning operation.

3. The apparatus as defined in claim 1 wherein said means connecting the suspension member with said skinning device includes an elongate horizontal member secured to said suspension member and movable therewith a pivot arm pivotally connected with one end of said horizontal member, and pivot means pivotally connecting said pivot arm with said skinning device housing to permit pivoting of the skinning device about an axis disposed substantially parallel to said horizontal member.

4. The apparatus as defined in claim 3 wherein said pivotal connection between the pivot arm and said skinning device is located at approximately the center of gravity of said skinning device.

5. The apparatus as defined in claim 3 wherein skinning device is provided with a pair of handles to be gripped by an operator, means on one of said handles for energizing said first power means and rotate said tooth roller in a clockwise direction, and means on said other handle to energize said first power means and rotate said tooth roller in a counterclockwise direction.

6. The apparatus as defined in claim 5 and means on one of said handles for actuating said second power means to cause raising of the suspension member and skinning device, and means on the other handle for actuating said second power means to cause lowering of said suspension member and skinning device.

7. The apparatus as defined in claim 1 wherein said stripper bar on said housing includes a latch element movable between latch and release positions, said latch element when in the release position permitting said stripper bar to be removed from said housing.

8. The apparatus as defined in claim 1 wherein said mounting means for said blade includes an elongate vertically oriented blade retainer movably mounted on said housing, an elongate clamping wedge pivotally mounted on said housing for pivoting movement of the clamping and non-clamping positions with respect to said retainer, said wedge and retainer having coacting clamping surfaces thereon, said wedge urging said retainer into gripping relation with said blade when said wedge is in the clamping position.

9. The apparatus as defined in claim 1 wherein said stationary support is vertically oriented and said suspension member is positioned within said stationary support.

* * * * *